United States Patent [19]

Jackson

[11] Patent Number: 5,322,998
[45] Date of Patent: Jun. 21, 1994

[54] CONICAL BLUR FILTER FOR REDUCING ARTIFACTS IN IMAGING APPARATUS

[75] Inventor: Todd A. Jackson, Pittsford, N.Y.

[73] Assignee: Eastman Kodak Company, Rochester, N.Y.

[21] Appl. No.: 40,948

[22] Filed: Mar. 31, 1993

[51] Int. Cl.⁵ .................................. H01J 3/14
[52] U.S. Cl. .................................. 250/216; 359/709
[58] Field of Search .................. 250/216, 208.1; 359/559, 709, 737; 358/213.13, 55; 382/31

[56] References Cited

U.S. PATENT DOCUMENTS

| | | | |
|---|---|---|---|
| 4,101,929 | 7/1978 | Ohneda et al. | 358/44 |
| 4,111,561 | 9/1978 | Plummer | 356/225 |
| 4,518,864 | 5/1985 | Inuiya | 250/578 |
| 4,896,217 | 1/1990 | Miyazawa et al. | 358/213.11 |
| 4,989,959 | 2/1991 | Plummer | 350/447 |
| 4,998,800 | 3/1991 | Nishida et al. | 350/162.2 |
| 5,140,469 | 8/1992 | Lamarre et al. | 359/709 |

FOREIGN PATENT DOCUMENTS

| | | | |
|---|---|---|---|
| 3248695-A | 2/1990 | Japan | G02B 27/46 |
| 3-65922-A | 3/1991 | Japan | G02B 27/46 |

*Primary Examiner*—David C. Nelms
*Assistant Examiner*—K. Shami
*Attorney, Agent, or Firm*—David M. Woods

[57] ABSTRACT

An optical blur filter having a substantially conical shape is used in imaging apparatus to limit high spatial frequencies incident upon an image sensor, and thereby to reduce undersampling artifacts. By having a conical shape, the filter images a circular blur pattern upon an array of adjacent photosites. A conical shape with a distinct vertex images an annular pattern, and a flattened vertex fills in the central region of the pattern.

9 Claims, 2 Drawing Sheets

CONICAL BLUR FILTER FOR REDUCING ARTIFACTS IN IMAGING APPARATUS

FIELD OF INVENTION

The present invention pertains to an optical low-pass filter used in the optical path of an electronic imaging system to reduce aliasing, or undersampling, effects.

BACKGROUND OF THE INVENTION

An electronic imaging system typically produces a signal output corresponding to a viewed object by spatially sampling an image of the object in a regular pattern with an array of photosensitive elements, such as, for example, with a charge-coupled device (CCD) solid-state image sensor. In such an imaging system, it is well-known that detail components in the object which contain frequencies too high to be analyzed within the sampling interval of the sensor contribute to the amplitudes of lower frequency components, and thereby produce imaging errors commonly referred to as aliasing or undersampling artifacts. In particular, if spatial detail being imaged contains a high frequency component of a periodicity smaller than the pitch (periodicity) of each neighboring photosensitive picture element of the solid state image sensor, the subsequent detection of this high frequency component tends to result in a spurious signal due to aliasing.

In general, the electronic imaging system can minimize aliasing if its optical section has a frequency response that cuts off, or filters out, the higher frequency content of the object. As a result, the optical section generally employs an optical low pass filter to substantially reduce the high frequency component contained in the spatial detail of the image received by the image sensor. It is thus well-known in the prior art that the design of electronic imaging systems involves a trade-off between image sharpness and the susceptibility of the imaging system to aliasing distortions or undersampling artifacts.

To limit these artifacts, an optical filter such as, for example, a birefringent blur filter has become a common component in consumer color video cameras. U.S. Pat. Nos. 4,101,929 and 4,896,217 show typical examples of such filters. Such a filter is typically placed between a lens and the image sensor to provide a low-pass filter function which reduces the spatial frequency content of the object at frequencies above the Nyquist frequency of the photosensitive elements. This makes the imaging system less susceptible to aliasing distortion. For example, for many available sensors wherein equal pixel densities in each of the sensed colors provide that each of the sensed colors have the same Nyquist frequency, an achromatic low-pass, or "blur", function is effective in minimizing aliasing distortion. Such a function can readily be provided by a birefringent filter.

The birefringement blur filter is typically composed of filter plates manufactured from a crystalline material like quartz that exhibits a dual refraction effect when the crystal axes of the filter plates are oriented at an angle with respect to the plate surface. In this orientation, a randomly polarized ray of light passing through such a filter plate emerges as two separated polarized rays. The combination of several of such plates produces a multiple spot pattern from each incident point in the image. If this spot pattern distributes light energy over multiple photosensitive elements, then the effect of a blur is obtained. This will limit the optical transfer function of the system at spatial frequencies above the Nyquist frequency of the photosensitive elements. However, this type of filter suffers from the drawback that it is costly and complicated to manufacture. In addition, a practical birefringent filter tends to be rather large and thick. Indeed, the thickness required to achieve the desired blur requires a lens with a long back focal length in order to make room for the blur filter in the optical path. Space limitations often do not allow such an optical structure, and lens design becomes unduly complicated. Finally, since such a filter requires randomly, or nonpolarized, light, a polarizing filter cannot be allowed in such a system to obtain well known photographic polarizing effects.

It is also well known in the art to use a phase diffraction grating as a frequency selective filter to produce an image blur. For example, as shown in U.S. Pat. No. 4,998,800, the periodicity of an image of a diffraction grating projected onto a solid state image sensor is selected to be a multiple of the periodicity of the photosensitive picture elements, and a blurred image is obtained. This type of filter, however, suffers from the drawback that, instead of producing a tightly controlled pattern over a few photosensitive elements, it spreads light over many interference fringes (orders) theoretically out to infinity. In addition, it is difficult to control the energy distribution in the fringes in order to obtain an acceptable blur function covering a designated number of pixels. Moreover, the energy distribution is dependent upon wavelength.

As can be appreciated from the foregoing remarks, there is a need in the art for a physically small blur filter that is inexpensive and relatively simple to manufacture, yet producing a tightly controlled blur pattern that is not dependent upon polarization techniques. As an alternative to the birefringent blur filter and the phase diffraction grating, U.S. Pat. No. 4,989,959 discloses a pyramidal structure comprised of four wedges which divide incident light into four quadrants so that light from the same image point impinges, on the average, on several photosensitive elements in the image sensing device. A concern with such a pyramidal filter is the manufacturing process, which would be required to produce four abutting facets at identical angles on a single piece of material. One facet would ordinarily be machined or ground into a single piece of material, the piece would then be cut into sections, and the sections glued together to form a piece shaped like a pyramid. This is a difficult process to execute with the needed precision. While there are optical benefits in using a pyramidal blur filter as compared to other blur filters known in the prior art, the manufacture thereof remains a complicated and costly process.

SUMMARY OF THE INVENTION

The aforementioned problems are solved by imaging apparatus that generates an image signal from incident image light, and has its higher spatial frequencies limited by a conical blur filter to reduce undersampling artifacts. The apparatus includes an image sensor for generating the image signal from an array of photosites, and an optical section having an optical filter with a substantially conical shape that includes a base and a vertex region. The optical filter is interposed in the path of the incident image light so as to output a blurred image upon the photosites.

As further specified in the subordinate claims, the blurred image may take the form of a circular blur pattern, for each input point source, that is imaged upon a plurality of photosites. Depending upon the shape of the filter, the circular blur pattern may be an annular blur pattern covering a two-dimensional array of photosites. In another embodiment, the vertex of the optical filter is flattened so that the central part of the pattern is filled in with blurred light.

The advantages of using a substantially conical blur filter according to invention include simpler and less complicated manufacture, and a tightly controlled blur pattern that is independent of wavelength or of the polarization state of incident image light. A camera system employing this filter, therefore, can be used with popular polarizing filters. In addition, the small size of the filter insures that it will fit within compact apparatus.

BRIEF DESCRIPTION OF THE DRAWINGS

The invention will be described in relation to the drawings, wherein.

DESCRIPTION OF THE PREFERRED EMBODIMENTS

Since electronic imaging apparatus, particularly electronic cameras using solid state sensors, are well known, the present description will be directed in particular to elements forming part of, or cooperating more directly with, apparatus in accordance with the present invention. Elements or techniques not specifically shown or described herein may be selected from those known in the art. For instance, geometrical relationships of the optical components are not shown or described in detail, except where necessary to describe the invention. Moreover, relative sizings of components shown in the figures are not meant to be taken to scale, since the necessary geometrical relationships and sizings can be readily discerned by one of ordinary skill in this art.

Figure 1:
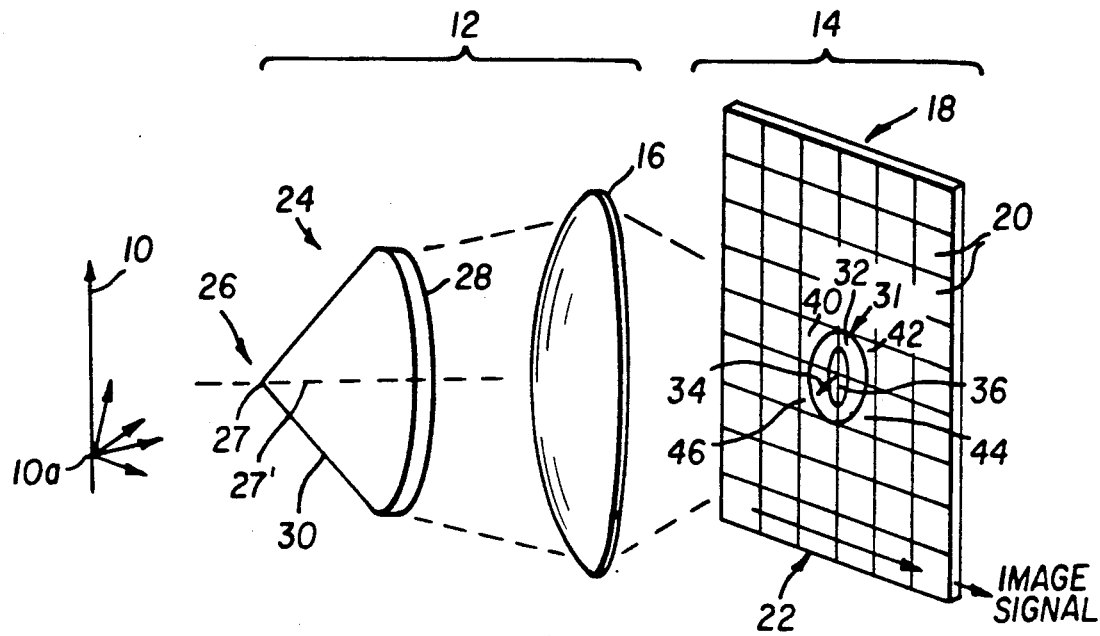
FIG. 1 is an illustration of a first embodiment of an imaging system using a conical blur filter according to the invention.
Figure 2:
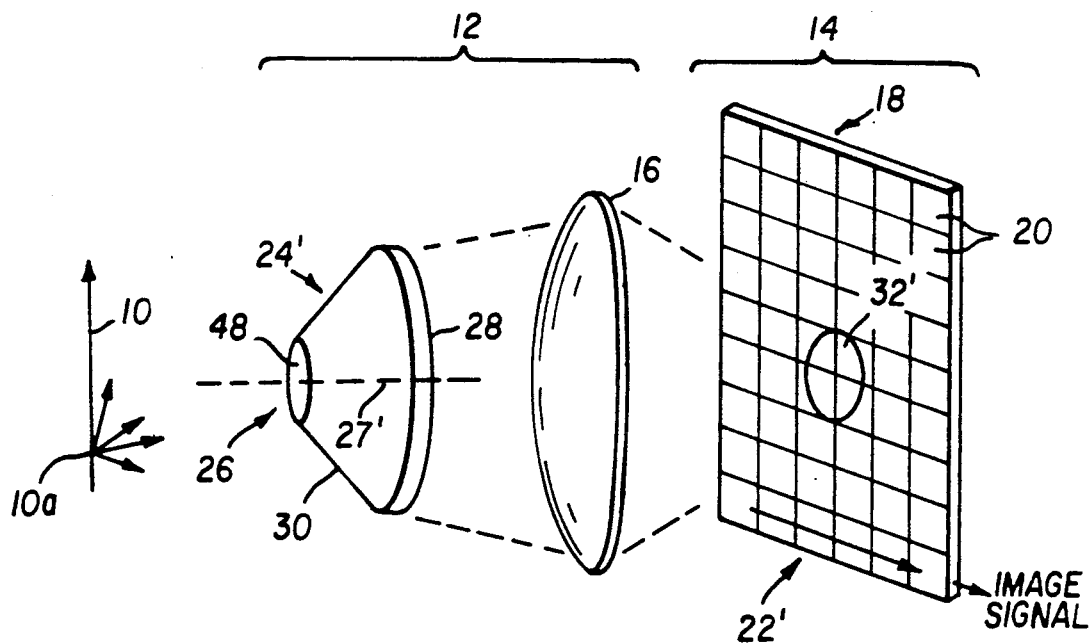
FIG. 2 is an illustration of a second embodiment of the invention showing a conical blur filter with a flattened tip.

Since FIGS. 1 and 2 respectively show two embodiments of the invention, the same reference character will be used wherever possible to refer to the same component. In each embodiment, an image of an object 10 is optically processed in an optical section 12 and converted into an image signal in an imaging section 14. The imaging section 14 includes an image sensor 18 comprised of a two-dimensional array of photosites 20 and an output register 22 for outputting the image signal. Referring first to FIG. 1, the optical section 12 includes a lens 16 and a substantially transparent conical filter 24 having a vertex region 26, a base 28, and a conical surface 30 therebetween. The vertex region 26 is oriented toward incident image light from the object 10 and the base is oriented toward the imaging section 14 so as to output a blurred image of the object 10 upon the photosites 20. In the embodiment of FIG. 1, the vertex region 26 includes a vertex point 27 on a conical axis 27', the conical axis 27' being generally directed toward the incident image light.

Figure 3A:
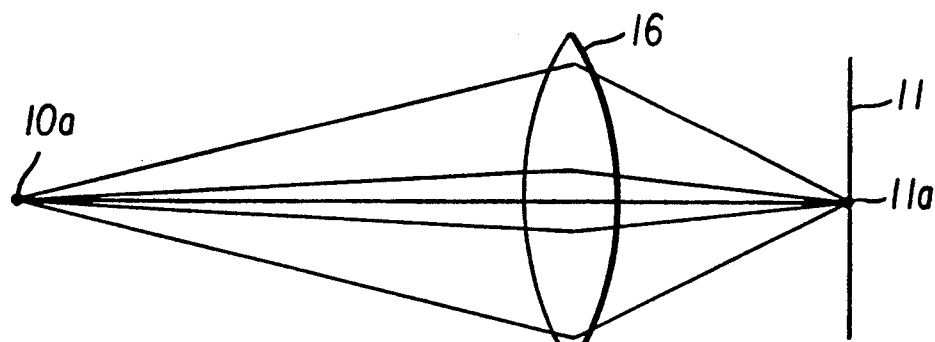
FIGS. 3A, 3B, and 3C are geometrical diagrams useful in explaining the invention.
Figure 3B:
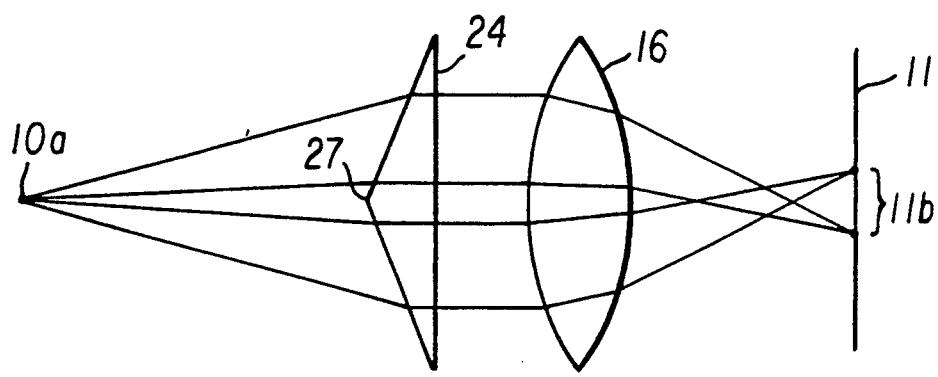
Figure 3C:
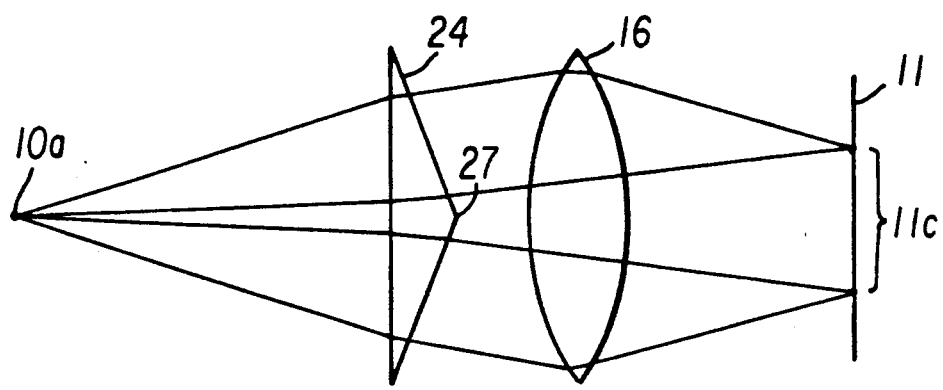

The conical shape of the filter 24 maps each point in the image into a circular pattern at the focal plane of the lens 16, thereby effecting a low pass blur function. For instance, in FIGS. 3A, 3B, and 3C the effect upon an image of a conical optical element versus a simple lens is shown. In FIG. 3A, a conventional lens 16 images a point source 10a as a point image 11a in the image plane 11. Little or no blurring occurs. By comparison, FIG. 3B shows the same lens 16 with the conical filter 24 (shown in cross section) interposed in the path of incident image light between the lens 16 and the point source 10a. By orienting the vertex 27 toward the point source 10a, an annular blur spot 11b is imaged upon the image plane 11. By orienting the vertex 27 of the conical filter 24 toward the lens 16, as shown in FIG. 3C, a blur spot 11C is imaged upon the image plane 11. The difference in the blur spots 11b and 11c is in the ray paths, as shown in FIGS. 3B and 3C.

Referring again to FIG. 1, a point 10a on the object 10 emits light rays that are imaged as a circular blur pattern 31 on the image sensor 18, which is positioned at the focal plane of the lens 16. The blur pattern 31 has an annular blurred region 32 having an average radius 34 and a central clear region 36. The size of the annular region 32 depends upon the geometrical arrangement of the filter 24 and lens 16 relative to the image sensor. In FIG. 1, the geometry is chosen such that the blur pattern 31 equally covers four adjacent photosites 40, 42, 44, and 46.

In FIG. 2, a second embodiment is shown in which the vertex region 26 has been flattened to form a flat tip 48 in place of the vertex point 27, thus forming a flattened conical filter 24'. The main advantage of the flat tip 48 is to fill in the central clear region 36 (in FIG. 1) with image light and thereby to provide a filled blur pattern 32 ' as shown in FIG. 2. This results in a more uniformly blurred spot than can be provided with a simple annular shape.

Manufacture of the conical structures 24, 24' shown in the embodiments of FIGS. 1 and 2, are believed to be within the skill of an ordinary artisan. For example, the filters could be cut out of a plastic, such as polymethyl methacrylate, by using a submicron resolution lathe (such as the ASG-2500T submicron lathe manufactured by Rank Pneumo, a subsidiary of Rank America, Inc.). The cut part would then be polished and would serve as a master from which a mold could be formed. Conventional injection molding of plastic or glass could then be used to produce copies of the part.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention. As one example, and as shown in FIGS. 3B and 3C, it should be clear that the vertex 27 of the conical filter 24 may be oriented either toward the incident image light or toward the lens 16.

PARTS LIST

10 OBJECT
10A POINT
11 IMAGE PLANE
11A POINT IMAGE
11B BLUR SPOT
11C BLUR SPOT

12 OPTICAL SECTION
14 IMAGING SECTION
18 IMAGE SENSOR
20 PHOTOSITES
22 OUTPUT REGISTER
24 CONICAL FILTER
24' FLATTENED CONICAL FILTER
26 VERTEX
27 VERTEX POINT
27' CONICAL AXIS
28 BASE
30 CONICAL SURFACE
31 CIRCULAR BLUR PATTERN
32 ANNULAR BLURRED REGION
32' FILLED BLUR PATTERN
34 AVERAGE RADIUS
36 CENTRAL CLEAR REGION
40 PHOTOSITE
42 PHOTOSITE
44 PHOTOSITE
46 PHOTOSITE
48 FLAT TIP

What is claimed is:

1. An imaging apparatus for generating an image signal from incident image light having its higher spatial frequencies limited to reduce undersampling artifacts, said apparatus comprising:
   an image sensor for generating the image signal from an array of photosites; and
   an optical section having an optical filter with a substantially conical shape that includes a base and a vertex region, said optical filter interposed in the path of the incident image light so as to output a blurred image upon said photosites.

2. An imaging apparatus as claimed in claim 1 wherein said optical section includes a lens positioned between said optical filter and said photosites for imaging the blurred image upon said photosites.

3. An imaging apparatus for generating an image signal from incident image light having its higher spatial frequencies limited to reduce undersampling artifacts, said apparatus comprising:
   a substantially transparent conical filter having a base and a vertex located along a conical axis defined therebetween, said conical filter having its conical axis directed toward the incident image light so as to output a circular blur pattern for each input point source;
   an image sensor for generating an image signal from a two-dimensional array of photosites; and
   a lens positioned between said conical structure and said image sensor for imaging the blur pattern upon a plurality of photosites to thereby limit the higher spatial frequencies.

4. An imaging apparatus as claimed in claim 3 wherein said conical filter produces an annular blur pattern for each input point source that is imaged through said lens upon a two-dimensional array of photosites.

5. An imaging apparatus as claimed in claim 3 wherein the vertex of said conical filter is oriented toward the incident image light.

6. An imaging apparatus as claimed in claim 3 wherein the vertex of said conical filter is oriented toward said lens.

7. An imaging apparatus for generating an image signal from incident image light having its higher spatial frequencies limited to reduce undersampling artifacts, said apparatus comprising:
   a substantially transparent conical filter having a conical surface defined relative to a conical axis and a vertex flattened at the tip thereof, said conical filter having its conical axis directed toward the incident image light as to output a circular blur pattern for each input point source, said blur pattern having an annular component dependent upon the conical surface and a central component dependent upon the flattened vertex;
   an image sensor for generating an image signal from a two-dimensional array of photosites; and
   a lens for imaging the circular blur pattern upon a combination of said photosites to thereby limit the higher spatial frequencies.

8. An imaging apparatus as claimed in claim 7 wherein the flattened vertex of said conical filter is oriented toward the incident light.

9. An imaging apparatus as claimed in claim 7 wherein the flattened vertex of said conical filter is oriented toward said lens.

* * * * *